(12) United States Patent
Tabata

(10) Patent No.: US 7,016,058 B1
(45) Date of Patent: Mar. 21, 2006

(54) NETWORK CONTROL METHOD AND SYSTEM

(75) Inventor: Yasuhiro Tabata, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/438,515

(22) Filed: Nov. 12, 1999

Related U.S. Application Data

(63) Continuation of application No. 08/786,643, filed on Jan. 21, 1997, now Pat. No. 6,198,542.

(30) Foreign Application Priority Data

Jan. 18, 1996 (JP) .............................. 08-006767

(51) Int. Cl.
  *G06F 15/00* (2006.01)
(52) U.S. Cl. ..................... 358/1.15; 358/468
(58) Field of Classification Search ................ 358/1.1, 358/1.2, 1.12, 1.13, 1.14, 1.15, 405, 407, 358/468
  See application file for complete search history.

(56) References Cited

U.S. PATENT DOCUMENTS

| | | | | |
|---|---|---|---|---|
| 5,603,060 A | * | 2/1997 | Weinberger | ............... 399/8 |
| 5,625,757 A | * | 4/1997 | Kageyama et al. | ........ 358/1.14 |
| 5,726,883 A | * | 3/1998 | Levine et al. | ............... 364/188 |
| 5,727,135 A | * | 3/1998 | Webb et al. | ............... 358/1.14 |
| 5,768,516 A | * | 6/1998 | Sugishima | .................. 709/217 |
| 5,991,846 A | * | 11/1999 | Ooki | .......................... 710/241 |
| 6,369,905 B1 | * | 4/2002 | Mitsuhashi et al. | ........ 358/1.15 |

FOREIGN PATENT DOCUMENTS

| | | |
|---|---|---|
| JP | 7-44474 | 2/1995 |
| JP | 7-230372 | 8/1995 |

* cited by examiner

*Primary Examiner*—Mark Wallerson
(74) *Attorney, Agent, or Firm*—Oblon, Spivak, McClelland, Maier & Neustadt, P.C.

(57) ABSTRACT

A network control system including a computer network and a plurality of image forming apparatuses connected to the computer network, each configured to record an image on a recording paper. A server is connected to the computer network and stores a graphic layout of an operation panel of all of the plurality of image forming apparatuses connected to the computer network and stores information items of all of the plurality of image forming apparatuses connected to the computer network. The computer includes a display to display the graphic layout and the information items stored in the server and an input device to select the image forming apparatus for recording by selecting the information items displayed on the computer display.

24 Claims, 11 Drawing Sheets

| NAME OF THE MODEL | INSTALLMENT PLACE | NAME OF THE DEPARTMENT | OCCUPIED(?)/NOT OCCUPIED | PRESENCE/ABSENCE OF FAILURE |
|---|---|---|---|---|
| RICOPY FT5500 | FIRST BUILDING, THIRD FLOOR - WEST | GENERAL AFFAIRS DEPARTMENT | OCCUPIED | |
| RICOPY FT8100 | FIRST BUILDING, THIRD FLOOR - EAST | PERSONNEL AFFAIRS DEPARTMENT | | TONER EMPTY |
| IMAGIO MF150 | FIRST BUILDING, SECOND FLOOR - CENTER | ACCOUNTING AFFAIRS DEPARTMENT | | |
| IMAGIO MF530 | FIRST BUILDING, SECOND FLOOR - EAST | ACCOUNTING AFFAIRS DEPARTMENT | OCCUPIED | |
| PRETER 550 | FIRST BUILDING, FOURTH FLOOR - WEST | DESIGN SECTION, IN DESIGN DEPARTMENT | | |
| RIFAX L80 | FIRST BUILDING, THIRD FLOOR - CENTER | DESIGN SECTION, IN DESIGN DEPARTMENT | | |

| NAME OF THE MODEL | INSTALLMENT PLACE | NAME OF THE DEPARTMENT | OCCUPIED(?)/NOT OCCUPIED | PRESENCE/ABSENCE OF FAILURE |
|---|---|---|---|---|
| RICOPY FT5500 | FIRST BUILDING, THIRD FLOOR - WEST | GENERAL AFFAIRS DEPARTMENT | OCCUPIED | |
| RICOPY FT8100 | FIRST BUILDING, THIRD FLOOR - EAST | PERSONNEL AFFAIRS DEPARTMENT | | TONER EMPTY |
| IMAGIO MF150 | FIRST BUILDING, SECOND FLOOR - CENTER | ACCOUNTING AFFAIRS DEPARTMENT | | |
| IMAGIO MF530 | FIRST BUILDING, SECOND FLOOR - EAST | ACCOUNTING AFFAIRS DEPARTMENT | OCCUPIED | |
| PRETER 550 | FIRST BUILDING, FOURTH FLOOR - WEST | DESIGN SECTION, IN DESIGN DEPARTMENT | | |
| RIFAX L80 | FIRST BUILDING, THIRD FLOOR - CENTER | DESIGN SECTION, IN DESIGN DEPARTMENT | | |

FIG. 5

PLEASE SELECT SUITABLE ONE FROM THE IMAGE FORMING APPARATUSES MENTIONED BELOW.

SELECTION  →  ☐   ☐

| INPUT ITEMS | RICOPY FT5500 | RICOPY FT8100 |
|---|---|---|
| STANDARD INPUT ITEM (*) | ○ | ○ |
| BOTH-SURFACES COPY SELECTION | ○ | ○ |
| ENLARGEMENT COPY SELECTION | ○ STEPWISE ENLARGEMENT | ○ (ZOOMING ENLARGEMENT) |
| REDUCTION COPY SELECTION | ○ STEPWISE REDUCTION | ○ (ZOOMING REDUCTION) |
| AUTOMATIC ENLARGEMENT/REDUCTION | — | ○ |
| AUTOMATIC PAPER SELECTION | ○ | ○ |
| PAPER SIZE SELECTION | — | ○ |
| AUTOMATIC ENLARGEMENT/REDUCTION | — | ○ |
| 2-in-1/4-in-1 SELECTION | ○ | ○ |
| SORTER | ○ | ○ |
| STAPLE | ○ | ○ |

(*) STANDARD INPUT ITEM INCLUDES MATTERS MENTIONED BELOW;
A NUMBER OF COPIED SHEETS, IMAGE DENSITY ADJUSTMENT, PRINTING INSTRUCTION, AND CLEAR SWITCH

FIG. 6

| INPUT ITEMS | PRESENCE/ABSENCE OF DESIRE | PRIORITY ORDER |
|---|---|---|
| BOTH-SURFACES COPY SELECTION | O | O |
| ENLARGEMENT COPY SELECTION (STEPWISE ENLARGEMENT) | | |
| ENLARGEMENT COPY SELECTION (ZOOMING ENLARGEMENT) | | |
| REDUCTION COPY SELECTION (STEPWISE REDUCTION) | | |
| REDUCTION COPY SELECTION (ZOOMING REDUCTION) | | |
| AUTOMATIC ENLARGEMENT/REDUCTION | | |
| AUTOMATIC PAPER SELECTION | O | |
| PAPER SIZE SELECTION | | |
| PAGE SERIES COPY SELECTION | | |
| 2-in-1/4-in-1 SELECTION | | |
| SORTER | O | O |
| STAPLE | O | |

*FIG. 8*

YOUR REQUESTED INPUT ITEMS ARE AS FOLLOWS.

| INPUT ITEMS | PRESENCE/ABSENCE OF DESIRE | PRIORITY ORDER |
|---|---|---|
| BOTH-SURFACES COPY SELECTION | | |
| AUTOMATIC PAPER SELECTION | O | |
| SORTER | O | O |
| STAPLE | O | O |

AS A RESULT OF RETRIEVAL, THERE IS NO MACHINE MODEL SATISFYING ALL OF REQUESTED INPUT ITEMS. HOWEVER, THE MODELS SATISFYING THE INPUT ITEMS OF HIGH PRIORITY ORDER ARE AS FOLLOWS. PLEASE SELECT ONE MODEL YOU WANT TO USE.

| NAME OF THE MODEL | INSTALLMENT PLACE | NAME OF THE DEPARTMENT | OCCUPIED/NOT-OCCUPIED | PRESENCE/ABSENCE OF FAILURE | SELECTION |
|---|---|---|---|---|---|
| RICOPY FT5500 | FIRST BUILDING, THIRD FLOOR - WEST | GENERAL AFFAIRS DEPARTMENT | OCCUPIED | | |
| RICOPY FT8100 | FIRST BUILDING, THIRD FLOOR - EAST | PERSONNEL AFFAIRS DEPARTMENT | | | O |
| IMAGIO MF150 | FIRST BUILDING, SECOND FLOOR - CENTER | ACCOUNTING AFFAIRS DEPARTMENT | | TONER EMPTY | |
| IMAGIO MF530 | FIRST BUILDING, SECOND FLOOR - EAST | ACCOUNTING AFFAIRS DEPARTMENT | OCCUPIED | | |

FIG. 9

(1) THERE IS NO MACHINE MODEL SATISFYING ALL FOUR ITEMS.

(2) MODELS SATISFYING THREE ITEMS

| NAME OF THE MODEL | INSTALLMENT PLACE | NAME OF THE DEPARTMENT | OCCUPIED/NOT-OCCUPIED | PRESENCE/ABSENCE OF FAILURE | SELECTION |
|---|---|---|---|---|---|
| RICOPY FT5500 | FIRST BUILDING, THIRD FLOOR - WEST | GENERAL AFFAIRS DEPARTMENT | OCCUPIED | | |
| RICOPY FT8100 | FIRST BUILDING, THIRD FLOOR - EAST | PERSONNEL AFFAIRS DEPARTMENT | | | |

(3) MODELS WHICH MEET TWO ITEMS

| NAME OF THE MODEL | INSTALLMENT PLACE | NAME OF THE DEPARTMENT | OCCUPIED/NOT-OCCUPIED | PRESENCE/ABSENCE OF FAILURE | SELECTION |
|---|---|---|---|---|---|
| IMAGIO MF150 | FIRST BUILDING, SECOND FLOOR - CENTER | ACCOUNTING AFFAIRS DEPARTMENT | | TONER EMPTY | |
| IMAGIO MF530 | FIRST BUILDING, SECOND FLOOR - EAST | ACCOUNTING AFFAIRS DEPARTMENT | OCCUPIED | | |

*FIG. 10*

NETWORK CONTROL METHOD AND SYSTEM

This application is a Continuation of application Ser. No. 08/786,643 Filed on Jan. 21, 1997 now U.S. Pat. No. 6,198,542

BACKGROUND OF THE INVENTION

1. Field of the Invention

The present invention relates to a network control method and system which connects a computer with an image forming apparatus via a network, performs various kinds of controlling of an image forming apparatus from the computer, and is configured to grasp operational state data from the image forming apparatus.

2. Discussion of the Background

In the recent years, computers have become much more commonplace in an office environment. Documents developed on a computer are often either output in hard-copy form from a printer or sent by computer correspondence to some distant place. Likewise, the documents received by computer correspondence are output by a printer connected to a computer and so on.

Copying machines are marketed as an independent office automation apparatus, and thus are often viewed as "stand-alone" devices. However, consistent with office automation initiatives, a number of multi-functional machines having both a copying function and a printer function which that are both connectable to a computer are increasing. Consequently, as the number of apparatuses for outputting documents (e.g., printer, facsimiles, and copying machines) increases in an office, so does the required space for hosting the increasing number of apparatuses.

In light of the trend for increased computer automation, and the associated space requirements, multi-functional machines that perform the functions of multiple traditional stand-alone devices are also increasing in number. Multi-functional machines are attractive because only one device needs to be installed rather than a plurality of apparatuses.

One approach for consolidating computer resources is to connect a printer for common use by a plurality of computers via a networks such as a LAN (Local Area Network). Furthermore, for example, the systems described in Japanese Laid-open Patent Publication No. 2-16076/1990 and Japanese Laid-open Patent Publication No. 3-63161/1991 are well known related art.

And further, in Japanese Laid-open Patent Publication No. 2-67167/1990, a plurality of printers are connected to a network and additionally, the name of each printer or the like can be read out on the network. A device for seeking suitable processing "efficiency information" obtained from a plurality of printers on the network is disclosed in Japanese Laid-open Patent Publication No. 2-12323/1990 and Japanese Laid-open Patent Publication No. 6-143755/1994. An automatic selection of the printer which achieves an output demand of the computer by exchanging information between the printer and the computer via the network is also disclosed in Japanese Laid-open Patent Publication No. 173173/1992.

However, regarding a combination of a computer and a printer, or a computer and a multi-functional machine, presently, these devices are considered distinct devices which are independently developed and manufactured, and therefore, mutual relationships and interfaces therebetween have not been fully identified. Needless to say, because both computer/printer and computer/multi-function units have to be connected to each other, the above-mentioned combination at least requires an interface so as to be compatible with one another.

Except special devices, a computer generates its own printing instruction through computer software. For example, instructions for printing in WINDOWS® by Microsoft Corp. are common regardless of the model of the printer. Namely, regardless of function and ability of the printer, if the printers are compatible with one another, the respective printers output sheets according to common printing instructions provided by the computer. In some advanced software applications, the number of printing conditions such as a number of printed sheet, a printing area in a sheet, an adjustment of printing layout or the like increases. However, these printing conditions exist regardless of how the function is achieved in the printer and the multi-functional machine.

Further, a printer, a facsimile, a copying machine, and a multi-functional machine are often connected to a computer as a terminal. However most recently, many of the copying conditions as seen in usual copying machines are not configured to operate with printing instructions from the computer. For example, in the device disclosed in Japanese Laid-open Patent Publication No. 7-20976/1995, the contents of which are incorporated herein by reference, filed by the present applicant, there is proposed to display both the operating condition of the multi-functional machine connected to the computer and the operating condition of the multi-functional machine registered in the computer. However, in the above apparatus, a technical field and a point of view are different than the present invention. Differences are evident in the displaying of only the operating condition, and the graphical displaying of the operating panel of the image forming apparatus such as a multi-functional machine or the like (as to be discussed with the present invention) which is chosen from the operating condition as a pre-registered value displayed in a display of the computer.

In such manner as stated above, there are some problems to be solved in the prior art, as identified by the present inventor, as stated below.

1. In a conventional computer, printer, multi-functional machine and the like interconnected in a network-based system, a computer cannot conveniently dispatch print instructions regardless of the function of the printer or other network terminal.

2. Even though the network terminal equipment connected to the computer is recognized in the background art, the condition of the network terminal is not recognized beforehand. Furthermore, even though the printer is connected to the network with the computer, a printing operation is disabled when the image forming apparatus is operating normally, malfunctioning or when the image forming apparatus is otherwise busy.

3. If an operating panel of the image forming apparatus cannot be seen by an operator, the operator cannot know whether the requested operating image forming condition is practicable. Even though the image forming apparatus connected to the network is displayed on the display of the computer, an operator is obliged to search the location where the outputting apparatus is located if the installed location of the apparatus is unknown to the operator. Furthermore, if the apparatus is installed in a distant place from the computer, it takes a long time for the operator to fetch the printed sheet, and total time for printing turns out to be long as a result thereof.

4. Even though the network is constructed to display on the image forming apparatus display connected thereto and to display the operating panel on the display of the image forming apparatus which is chosen by an operator to input the image forming condition, if only one apparatus is displayed from among a plurality of executable apparatuses, it is not convenient when another apparatus is located at a place closer than the image forming apparatus.

5. And further, a problem arises when no executable apparatus exists when a plurality of image forming conditions are input, and printing (image forming) is thus not possible at all. Even though there is an image forming apparatus which satisfies other image forming conditions, the satisfaction of an operator becomes lowered inevitably if there is no image forming condition which the operator particularly requires. Furthermore, assuming that an image forming apparatus is retrieved which nearly satisfies the image forming condition input by the computer, there are no countermeasures for satisfying the image forming condition(s) which is not met by the retrieved image forming apparatus.

6. Even though the apparatus which satisfies the image forming condition as sufficiently as possible and the apparatus having many high priority image forming conditions are displayed, it is impossible to determine to what extent the desired printing quality will be realized, because it is not clear which conditions input by an operator are met and not met.

SUMMARY OF THE INVENTION

The present invention has been made in consideration of such problems, and accordingly it is an object of the present invention to provide a network control system capable of printing a document and a drawing which are output from a computer utilizing the network control system's own image forming apparatus functions.

It is another object of the present invention to provide a network control system capable of utilizing its own printing function of the image forming apparatus as a terminal device.

It is still another object of the present invention to provide a network control system capable of recognizing a list of office automation terminals having respective printing functions available for use from a computer and capable of judging whether or not printing instructions are accepted by a terminal equipment.

It is still another object of the present invention to provide a network control system capable of choosing an image forming apparatus available for printing immediately in response to a printing instruction.

It is still another object of the present invention to provide a network control system configured to conveniently allow an operator to judge printing conditions including selection of an image forming apparatus from which to print.

It is still another object of the present invention to provide a network control system capable of improving printing producibility.

It is still another object of the present invention to provide a network control system capable of realizing improved print producibility in which an image forming apparatus connected to the network retrieves whether the image forming condition input in a computer is executable, and capable of improving print producibility by displaying a retreiving result.

It is still another object of the present invention to provide a network control system capable of supporting the operator's selection of the most suitable image forming apparatus by displaying the apparatus that most completely satisfies the image forming condition, even though the apparatus does not satisfying all aspects of the input image forming condition.

It is still another object of the present invention to provide a network control system capable of retrieving an image forming apparatus offering high user satisfaction and displaying an indication thereof.

It is still another object of the present invention to provide a network control system capable of inputting an image forming condition again by using an operating medium of an image forming apparatus which is retrieved by a computer, and capable of executing a printing operation as satisfactorily as possible for an operator.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 5 is an illustrative list displayed on a computer display where the list includes information of kinds of machines and related location, identification and status fields;

FIG. 6 is an illustrative diagram displayed on a computer display showing an operation panel in a list format;

FIG. 8 is an illustrative diagram showing data items input to a list which is requested by an operator including a priority order of the data items;

FIG. 9 is an illustrative diagram showing a result of retrieval excluding lower priority image forming apparatuses;

FIG. 10 is an illustrative diagram showing a result of displaying image forming apparatuses in an order based on a number of input items satisfied by the respective image forming apparatuses.

DESCRIPTION OF the PREFERRED EMBODIMENTS

Figure 1:
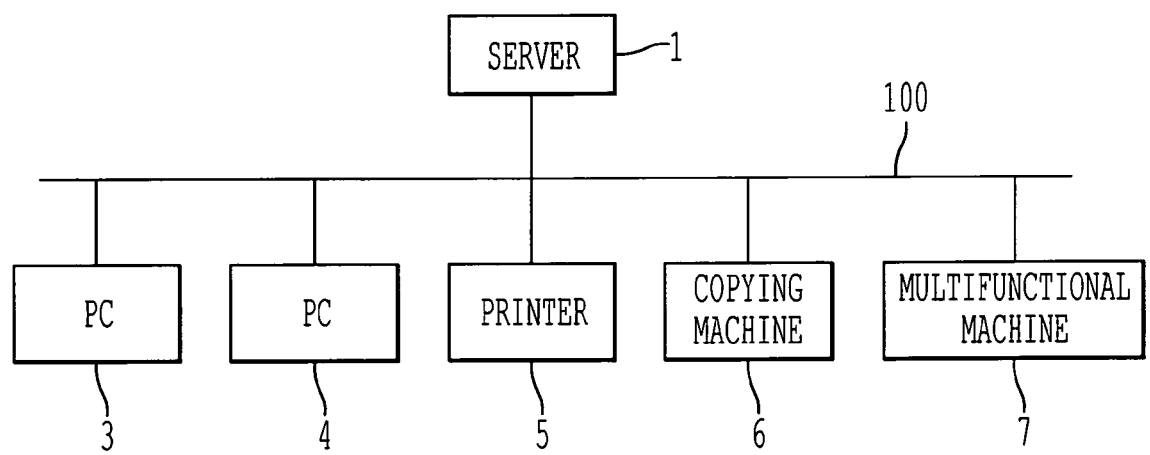
FIG. 1 is a block diagram of a computer network of an embodiment of the present invention.

Referring now to the drawings, wherein like reference numerals designate identical or corresponding parts throughout the several views, and more particularly to FIGS. 1–4 thereof there is illustrated a first embodiment of the present invention.

First Embodiment

Figure 2:
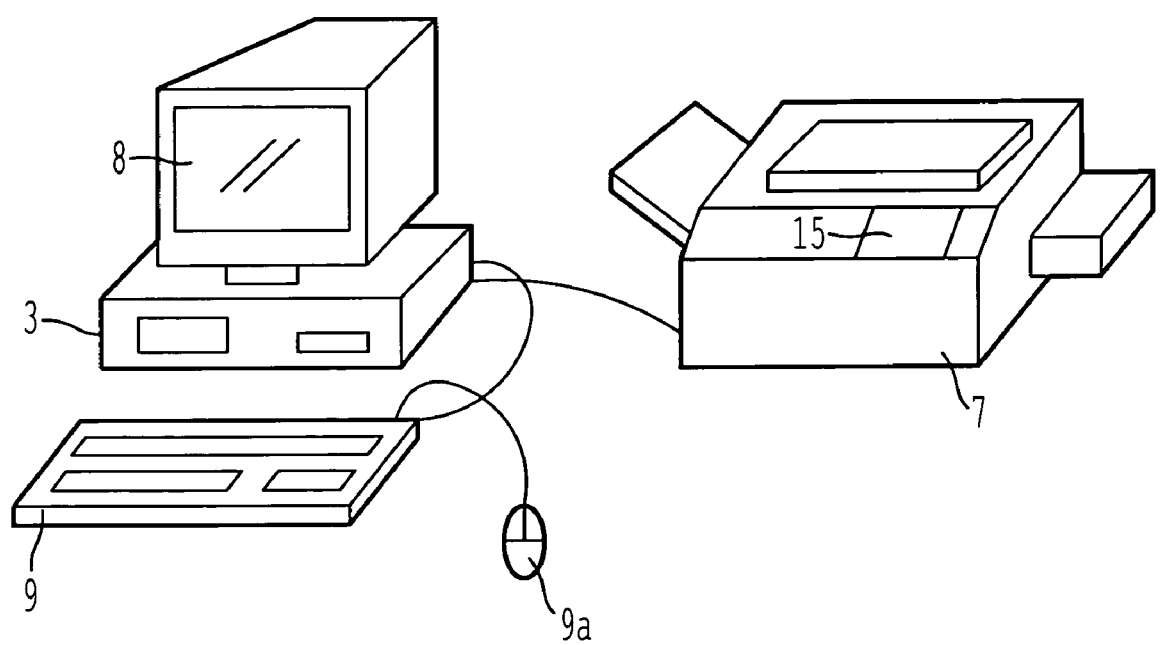
FIG. 2 is a perspective view illustrating a computer and a multi-functional machine according to the present invention.
Figure 3:
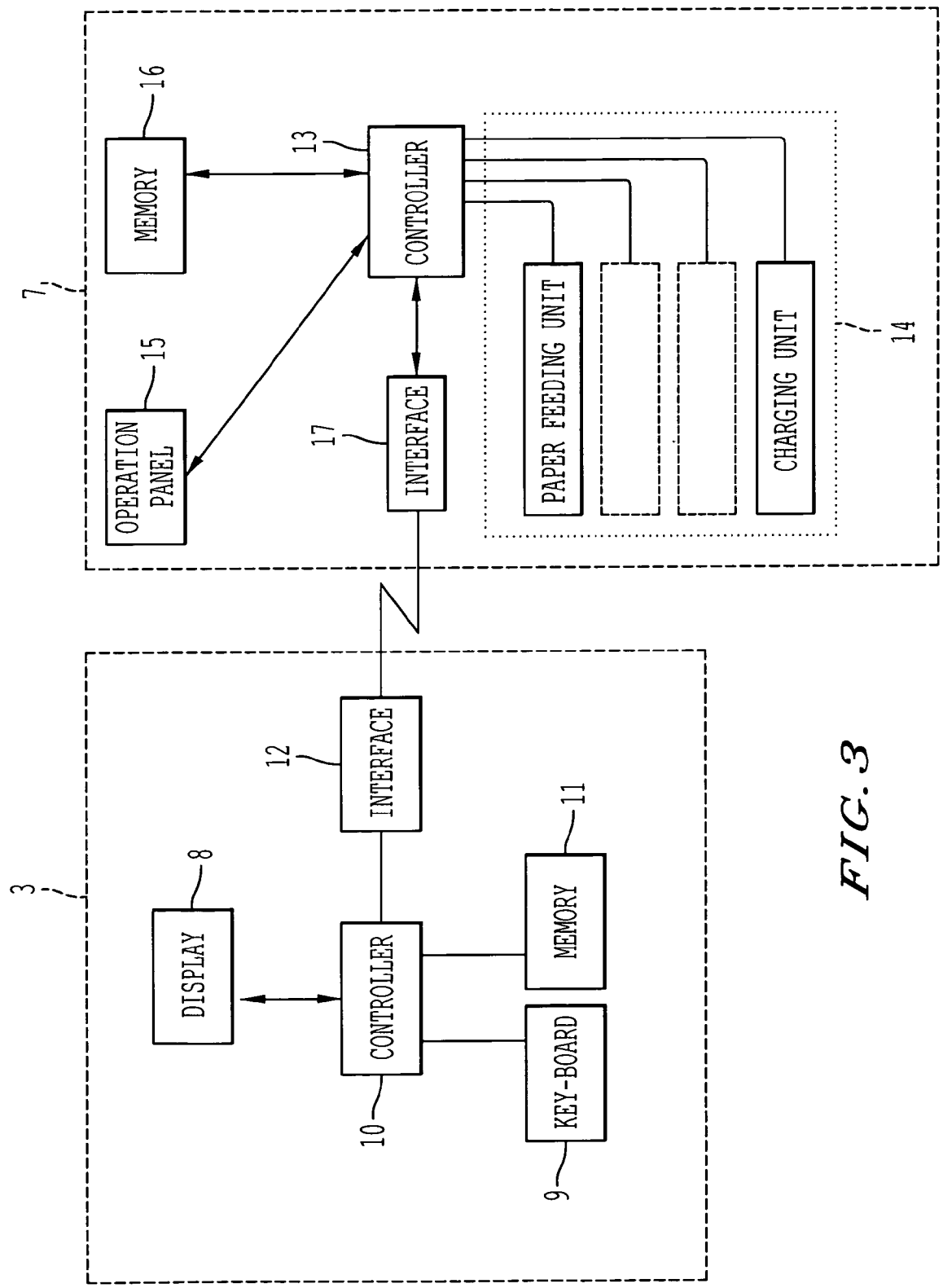
FIG. 3 is a block diagram of a computer and a multi-functional machine according to the present invention.
Figure 4:
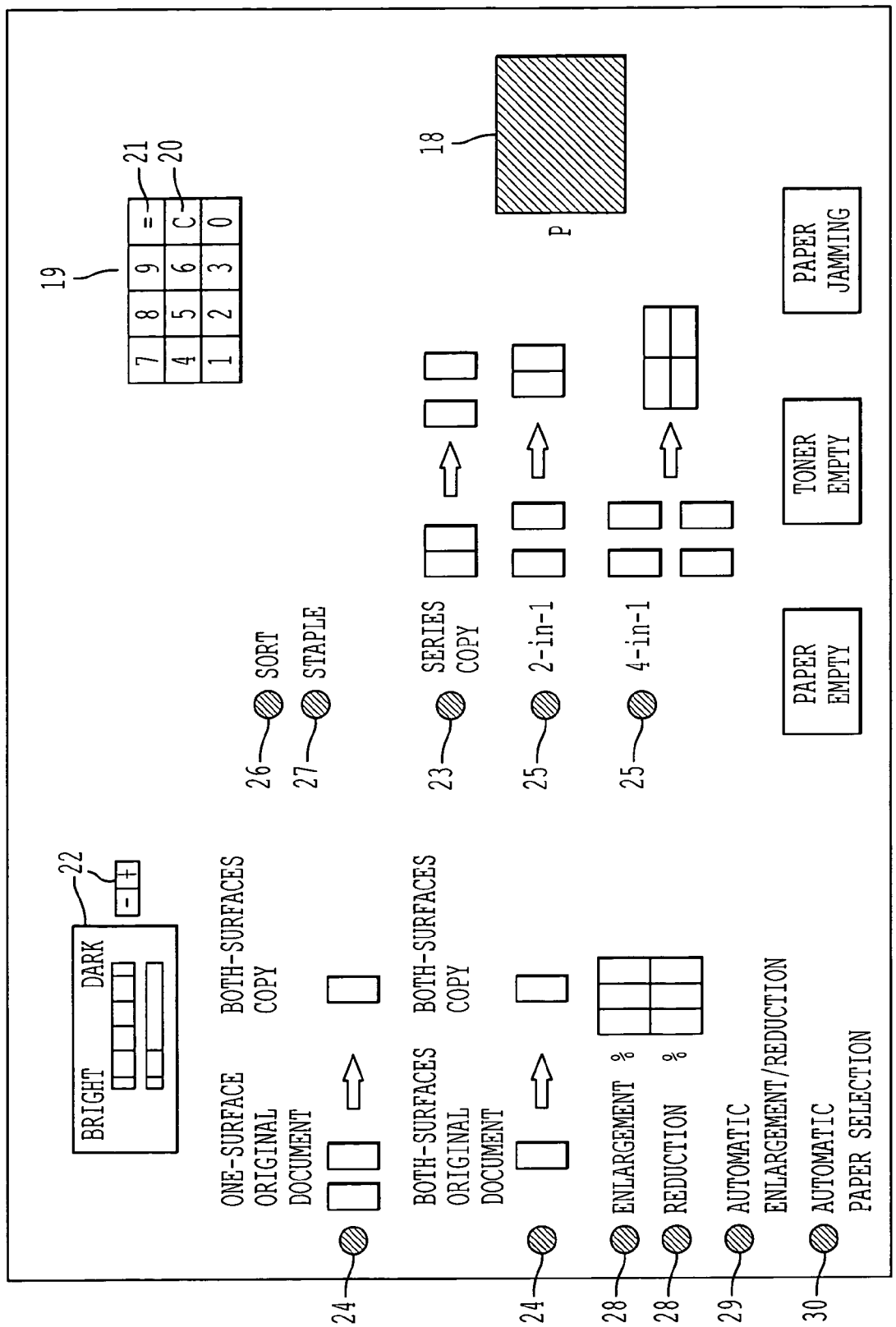
FIG. 4 is an illustrative diagram showing a state of a display on an operational panel in a multi-functional machine according to the present invention.

FIG. 1 is a schematic illustration of a network constructed with a LAN 100 (Local Area Network). FIG. 2 is an illustration of an example of a computer (e.g., personal computer) that connects to the LAN, where the computer includes a keyboard and a display, and a multi-functional machine that functions as a printer and a copying machine. FIG. 3 is a functional block diagram of respective internal portions of the computer and the multi-functional machine as shown in FIG. 2. FIG. 4 is an illustration of an operation panel of the multi-functional machine.

As is apparent from FIG. 1, the network includes the LAN 100 (such as a Novell Ethernet LAN) which interconnects a server 1 (e.g., an OptiPlex GL 5133 sold by Dell Computer Corp.), computers 3 and 4 (e.g., personal computers, PCs such as Aptiva model PCs offered by IBM corporation), a printer 5 (e.g., PC LASER SP10PS offered by Ricoh Company Ltd.), a photocopying machine 6 (e.g., Spirio 1500 offered by Ricoh Company Ltd.), and a multi-functional machine 7 (e.g., IMAGIO MF200 offered by Ricoh Company Ltd.) that includes a copying function, a facsimile function, scanner, etc. Furthermore, while only selected network components are shown in FIG. 1, it stands to reason that other network elements may also connect to the LAN 100. The server 1 holds information regarding which terminals (e.g., network components 3–7) are connected to the network, and also holds data unique to each of the terminals (e.g., address data, including Local and Internet Protocol, IP, addresses) at the same time.

As shown in FIGS. 2 and 3, the PC 3 is provided with a controlling device (controller) 10 (e.g., a motherboard having a central processing unit thereon as well as RAM, ROM, and specialized circuitry including application specific integrated circuits, ASICs), a display 8, a keyboard 9, a mouse 9a, and a memory 11, and is connected to the multi-functional machine 7 via a LAN interface (I/F) 12 (or alternatively a dedicated local interface or proprietary interface). While in this embodiment, an input device of the computer is Constructed with the keyboard 9 and the mouse 9a, but other input devices such as a touch panel for inputting data to the computer by the operation on the display 8 may be employed, and other display devices (e.g., plasma displays) etc. may be substituted for the components shown in FIGS. 2 and 3. In addition to the above, the multi-functional machine 7 is provided with a controlling device 13 (e.g., a processor-based controller), an image forming apparatus 14, an operation panel 15, a memory 16 and an interface (I/F) 17, and all of those latter elements are respectively connected to the controlling device 13, and also connected to the computer 3 via the interface 17 as shown in FIG. 3.

As shown in FIG. 4, the operation panel 15 (FIG. 3) of the multi-functional machine 7 preferably includes a print button 18, a ten-key arrangement 19 (e.g., for inputting a number of sheets to be copied) having a clear-key 20 and an interrupting-key 21, a copy image density adjusting button 22 and associated display, a series-copy selecting button 23, where "series copy" signifies a continuous copy for alternate pages), a duplex-copy selecting button arrangement 24, 2-in-1 and 4-in-1 selecting button arrangement 25 for implementing copying two or four originals onto one copy sheet with reduced copy size, a sort button 26, a staple button 27, a copy size changing (enlargement/reduction) button arrangement 28, an automatic copy size changing button 29, and an automatic sheet selecting button 30, or the like.

Additionally, a digital copying machine according to the present invention may include a subset of the above functions or additional functions. One such additional function is an image editing function which signifies, for example, an electronic sort, an image conversion for length and breadth, a translating copy (output of a computer which reads an English document by a scanner, translates into Japanese, and adds the Japanese meaning to the English-sentence word by word), a shadowing function, an outlining function (blanking on the center), a type style conversion, etc. Still further, the present invention accommodates color copying machines and color printers, which include various kinds of functions regarding color options. An operation panel 15 for these auxiliary functions is located on the front surface of the machine's upper part as shown in FIG. 2. Furthermore, in the multi-functional machine 7 of the present embodiment, a graphical image of the operation panel 15 having approximately the same layout and design is memorized in the memory 16.

A graphic layout of the operation panel 15 is stored in a memory of the server 1 (not shown) on the network 2. Preferably, the information inherently associated with a respective terminal required to be stored in the memory of the server 1 is stored when the multi-functional machine 7 is first connected to the network 2, by a service engineer or an operator. Alternatively, at the time of retrieving the inherent information from the computer 3 (for example), an operation panel can be constructed so as to take out the information on the operation panel from the memory 16 in the multifunctional machine 7 via the network 100 if necessary. The layout of the operation panel 15 of the multi-functional machine 7 is memorized in the memory 16 as the same layout or the approximately same layout in the present embodiment. However, only the items of the image forming condition inherent in the multi-functional machine 7 are displayed in a list.

As is apparent from the forgoing description, the server 1 is constructed such that the server 1 memorizes the items of the image forming conditions inherent in all of the image forming apparatus connected to the network 2, such as the copying machine 6, the printer 5, the multi-functional machine 7 (and other devices such as a facsimile device, or the like), and the information of machine model such as name of the machine model, installing place, presence or absence of the specification data, and existence or non-existence of a malfunction in the apparatus (or system), and when an operator requires to print document or figure to be made by the computer 3 or 4, the image forming apparatus available for printing can be known by indicating that in the list as will be discussed in reference to FIG. 5.

Returning to the operation panel of FIG. 4, an image of which is displayed at a selecting computer 3 or 4, the term '2-in-1' on a graphic operation panel represents an image forming apparatus operation capable of forming two original images of the same size onto one recording sheet. Usually, in order to form an image at the same time on a selected sheet, an original image is reduced to a required size. For example, suppose the size of an original image is A4, the two original images can be copied onto A4 by reducing the size of the original image to A5 respectively. In practice, the A5 size image thus reduced has to be rotated by 90°, and consequently, a digital copying machine or a printer is preferable for performing this operation. Furthermore, the term '4-in-1' represents an operation for copying four original images onto one recording sheet at the same time, and is accomplished in a manner similar to that discussed with respect to the "2-in-1" operation.

The 'C' mark in the clear-key button of the ten-key arrangement 19 has a function of returning an inputted numerical value to an initial value by use of a clear-key 20. A mark '=' on an interrupting-key 21 indicates a function of printing another job, thus interrupting a present job, before the present count value of the printing counter does not reach the predetermined count value. Regarding an adjustment of the image density, there is known a method of notifying an operator which degree of density is selected, in such a manner as that, when a density displaying part 22 is pressed down, a density scale-bar beneath the part 22 is illuminated. By operating a plus-key and a minus-key at a right part thereof, the illuminated density scale-bar can be moved to right and left direction, and the copy density of the image can be decided. It is possible also to commonly use the ten-key arrangement 19 for the purpose of enlarging or reducing an image size as a matter of course in cooperation with enlargement/reduction button arrangement 28.

Generally speaking, implementing the functions on the operation panel of FIG. 4 is accomplished by pressing a selecting button at the left side of the respective input items on the operation panel for the desired function. When a print button 'P' 18 is pressed after finishing the selection of an inputting condition in the form of numerical value, or selecting the items thereof, a printing instruction is outputted. Furthermore, in the case of performing the inputting operation from the computer 3, for example, the operation panel is displayed on the display 8 of the computer 3, for example. Based on a selection by the operator of the computer 3, a printing instruction is transmitted to the multi-functional machine 7, from the computer 3 or 4 which is inputted by selecting the key position or the button position by the mouse 9*a*. Still further, in the case of using the touch panel, it is sufficient for an operator only to press the corresponding position with a finger.

A state of ordinary use or a malfunction state of the image forming apparatus selected by the operation is displayed on the operational panel. The above functional/nonfunctional states thus displayed can be known by an operator of the computer in the same way as in the case of the usual printer and the multi-functional machine. In other words, the color of the print button 18 is changed to red if the apparatus is in use, or in the case of a display panel which is not color panel, the operator can be informed that the apparatus is in use by the reverse display indication (black to white, or vice versa) or the like. Furthermore, machine errors such as 'paper empty', 'toner empty', 'paper jamming', etc., are independently displayed by illuminating the respective signs at a lower part of right side of the indication panel, if any. The above states are displayed on-line, and thereby, the latest information can be known by an operator.

FIG. 5 shows an example of an information list of the machine models which is stored in a look-up table format in memory of the server 1. Respective entries in the look-up table are grouped according to respective attributes of the respective terminals on the LAN 100. For each terminal, attributes include data fields for "NAME OF THE MODEL", "INSTALLMENT PLACE", "NAME OF THE DEPARTMENT", "OCCUPIED(?)/NOT OCCUPIED" status, and "PRESENCE/ABSENCE OF FAILURE". Associated data for each of the terminals are stored in respective data fields, thereby keeping an up-to-date log of status information about each of the respective terminals.

A method of selecting the aforementioned image forming apparatus which is located close by to the operator and satisfies desired printing conditions (as will be explained hereinafter). Referring to FIG. 5, when an operator selects a most suitable image forming apparatus from the operation panel displayed in a display 8 of the computer 3, for example, by the mouse 9*a*, the operation panel information of the selected image forming apparatus is displayed on the display 8 of the operator's own computer 3 (via a message transfer from the server 1). In response, the operator can input the image forming condition to be printed, for example, by the mouse 9*a* (and/or the keyboard 9, or other suitable data input device). In such manner as stated above, the operator can operate the image forming apparatus remotely, as easily as if operating the respective apparatuses (a copying machine 6, a printer 5, a multi-functional machine 7, and a facsimile-device, etc.) locally.

The term "using-state" information, as used herein, signifies status information about whether the image forming apparatus is put in the usable state at present time, and whether the operator can select the apparatus for instant use (e.g., without queuing the request). Furthermore, it is also possible to display that, if the apparatus is being used, how many copies are presently set to be copied and of those how many copies have already finished copying as of the accessed time. Thereby, the operator can judge whether or not the apparatus is to be brought to an available state for using shortly thereafter, or whether the wait for the apparatus is too long of a time for use in the present scenario.

The phrase "failure-state information", as used herein, signifies the information which informs the operator of the functional state of the apparatus, including specific states such as "the apparatus cannot be used because of paper jamming", and "the apparatus cannot be used because of insufficient toner, and therefore the toner has to be replenished in the apparatus". Other specific functional states about the specific apparatuses are available to the operator as well, including "the apparatus cannot presently be used because it is presently in an abnormal operational state".

Furthermore, as is apparent from FIG. 5, such information as mentioned above further includes the information of the installation place (i.e., location) for the machine, a name of the building, installation floor, model name of the image forming apparatus, and other information such as the cognizant department for the machine.

The operator selects two models of the image forming apparatus among the apparatuses available for use in the network 100 viewing the state displayed as shown in FIG. 5. For example, suppose that the operator selects RICOPY FT5500®, and RICOPY FT8100® both installed near the operator's-working place, which is for example in the "first building" on the "third floor". Final selection of the apparatus to be made cannot yet be identified because a plurality (two) apparatuses are currently selected. Therefore, before making the final selection, another display, as shown in FIG. 6, the respective functions offered by the two candidate apparatuses are displayed in summary form to the operator, thereby facilitating the operator's final selection of desired apparatus.

In FIG. 6, when the operator requires any one of the image forming apparatuses, the operator selects it in the same way, for instance, by use of the mouse 9*a*. Therefore, the operation panel layout as shown in FIG. 4 is displayed on the display 8.

Figure 7:
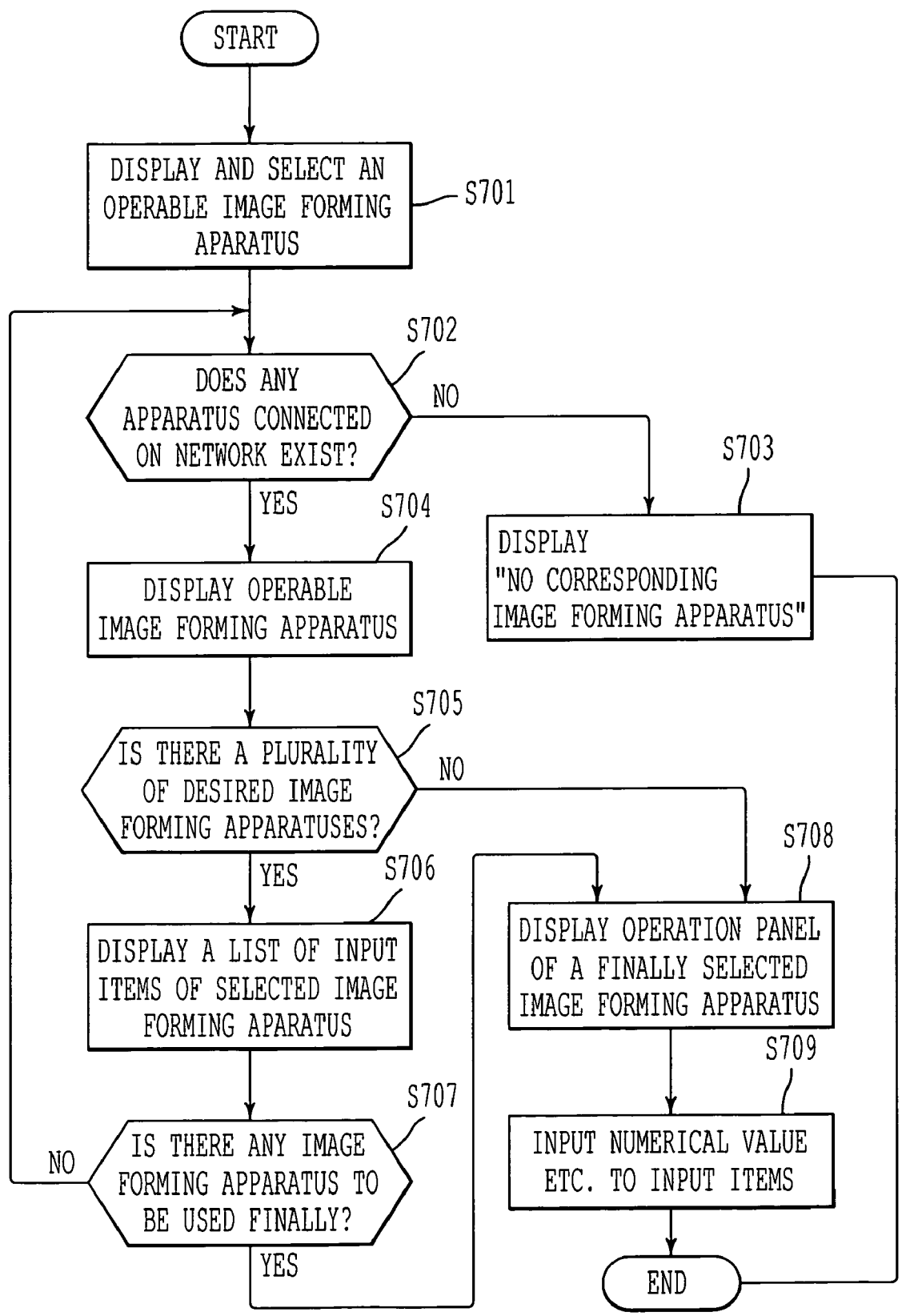
FIG. 7 is a flowchart showing an input procedure for selecting a final kind of machine from among image forming apparatuses available for printing.

FIG. 7 is a flowchart of a process for selecting a finally selected image forming apparatus from plural candidate image forming apparatuses. The process begins in step S701 where the operator selects a most suitable image forming apparatus from the screen displayed in FIG. 5. The process then proceeds to step S702 where a controller checks whether or not there is an apparatus connected to the network 100. If the response to the inquiry in step S702 is negative, the process proceeds to step S703 where the controller 10 displays a message "no corresponding image forming apparatus" is present. If the response in step S702 is affirmative, the process proceeds to step S704 where the controller displays an indication that at least one image forming apparatus is presently available for use. The process then proceeds to step S705 where an inquiry is made by the controller 10, checking for whether there is a plurality of image forming apparatuses. If the response to the inquiry is affirmative, the process proceeds to step S706 where a list of input items of the selected image forming apparatuses is displayed, as shown in FIG. 6. Subsequently, the process proceeds to step S707 where the controller 10 checks whether or not there exists an image forming apparatus to be finally used. If the response to the inquiry in step S707 is affirmative, the process proceeds to step S708 where an image of the operation panel 15 of the finally selected image forming apparatus is displayed by the controller 10 on the display 8. Thereafter the operator inputs numerical values or the like as the input items by the ten-key pad arrangement 19, in step 709. However, if in step S707 the response to the inquiry is negative the process returns to step S702. If the response to the inquiry in step S705 is negative, the process flows to steps S708 and S709 and previously described and the process ends. According to this process, the operator executes the selection process by conveniently viewing options presented by the display 8.

Second Embodiment

The aforementioned first embodiment is an example of displaying the model of the apparatus connected to the LAN 100, and it adopts the method of narrowing down the apparatuses thereof in a step-by-step manner. However, the second embodiment is an example implementation of the present invention which selects a suitable apparatus by retrieving whether there exists an image forming apparatus which satisfies the printing criteria requested by the operator. The operation displaying screen in this case like that shown in FIG. 8. Namely, in this embodiment, the items required by the operator are inputted into a visible attribute selection table as shown in FIG. 8. Items required by the operator are input by the operator and represented on the display 8 as indicated by the "o" symbols in FIG. 8. Functions that are absolutely required are displayed on the screen as a priority at the same time. Alternatively, a particular priority order may be inputted by the operator as numbers as 1, 2, 3, . . . After completing the inputting operation, the controller 10 issues retrieving instructions, and the controller 10 displays a list of image forming apparatuses which satisfy the condition to be required by the operator from among the apparatuses connected to the LAN 100. The same format of the list of FIG. 5 may be used for the present list. The most convenient apparatus for the operator is finally selected because the apparatus in this list satisfy all of the desired printing conditions. When the apparatus is selected finally, as explained in the first embodiment, the operation panel 15 of the selected apparatus is displayed on the display 8. This operation panel is the same one as that of the panel shown in FIG. 4, and when the panel is displayed. Subsequently, the panel display is available for accepting the input data, required numerical values or the like as the next necessary items.

However, it is not always probable that there exists an apparatus satisfying all of the required input items on some occasions. If the controller displays that there is no corresponding apparatus, the operator then inputs for a second time a subset of the features previously input by the operator. This process of limiting the number of requested features repeats until an apparatus is suitably identified.

Subsequently, the required input items are displayed, and at the same time the priority order is inputted as shown in FIG. 8. By thus pre-setting the above condition in the apparatus, when the input items of low priority are omitted from the retrieving items, the required apparatus model corresponding thereto can be found on some occasions, thereby expediting the selection process.

For instance, with respect to an example of the input items as shown in FIG. 8, although the stapling function thereof is required, the priority order is low nevertheless, and thereby the above condition is omitted from the selection criteria. If there exists an image forming apparatus that meets the priority criteria, but not the stapling criteria, the above state of existence is displayed thereon as the retrieving result.

At this time, the displaying method as shown in FIG. 9 may be convenient for the operator. Namely, as the retrieval result of omitting the items of low priority, displaying 'The input items of your request are as follows.', the controller 10 causes a display of the requested image forming apparatus and the priority order thereof, and further displaying, 'As the retrieving result, there was no apparatus satisfying all of the input items of your request'. However, the apparatuses which satisfy the input items of high priority order are as follows: 'Please select one of the apparatuses which you want.', the controller shows a name of the apparatus model, an installing place, a name of the department, whether the apparatus is being used or not, whether the apparatus has failed or not, and whether the apparatus is selectable or not.

The operator omits the apparatuses that are in use (occupied) and the apparatus having a malfunction (toner empty) among the apparatuses in the list, and thereafter selects RICOPY FT8100® listed on the second from the top. Subsequently, an operation panel 15 of the apparatus of RICOPY FT8100® as shown in FIG. 4 is displayed on the display 8 of the computer 3. The operator inputs the numerical value or the like of the input items by viewing the indication on the screen 8.

When there are no apparatuses satisfying the printing condition, even though the operator considers the low priority acceptable, the computer 3 displays an indication to this effect and the controller 10 redisplays the screen of FIG. 8. Namely, such information may be used as reference values for later narrowing down the input conditions by clarifying what had previously been input.

Figure 11:
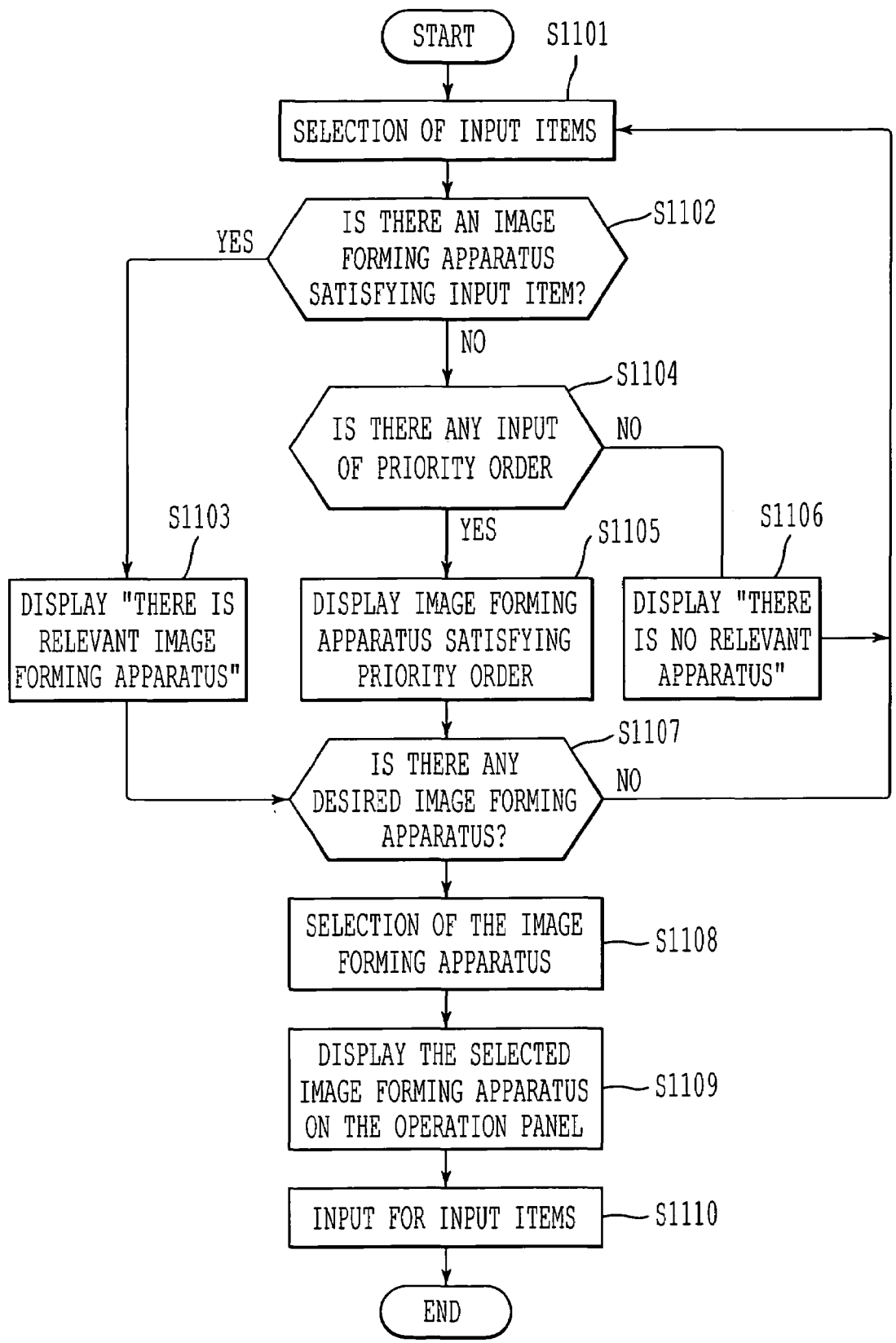
FIG. 11 is a flowchart of a procedure of selecting a requested image forming apparatuses after inputting items.

FIGS. 10 and 11 will be used to describe a modification of the second embodiment which is a device and method for displaying the image forming apparatus in the order of a number of input items which further satisfies the operator's request instead of the previous priority order approach. For example, suppose the operator inputs four input items as shown in FIG. 9, the retrieved result is displayed in the order of a number of the items which satisfies the required printing condition of the operator, as shown in FIG. 10. Although the input items are displayed in the order of the number thereof (e.g., all four conditions satisfied, three conditions satisfied . . . ), it is sufficient to display only the one of the largest number. Therefore, it may be allowed to display only the result of the items in FIG. 10.

FIG. 11 is a flowchart showing the above described procedure which beings in step S1101 when the input items are selected. The process then proceeds to step S1102 where the controller 10 checks whether or not an image forming apparatus satisfying the input items exists. If the response to the inquiry in step S1102 is affirmative, the process proceeds to step S1103 where an indication is displayed indicating that there is a relevant image forming apparatus and then the process proceeds to step S1107 (as will be discussed). If the response to the inquiry in step S1102 is negative, the process proceeds to step S1104 where an inquiry is made regarding whether the operator input a priority order. If the response to the inquiry in step S1104 is affirmative, the process proceeds to step S1105 where the controller 10 displays the image forming apparatuses satisfying the priority order. However, if the answer to the inquiry in step S1104 is negative, the controller 10 displays a message 'There is no relevant apparatus' and returns to step 1101. On the other hand, when the processes of the above-mentioned steps 1103 and 1105 are finished, the process flows to step S1107 where the operator is prompted to indicate if there is any desired image forming apparatus.

If the response to the inquiry in step S1107 is affirmative, the process flows to step S1108, where the operation panel 15 of the image forming apparatus selected in step S1109 is displayed on the display 8, and input items are entered in step S1110.

However, if the response to the inquiry in step S1107 is negative, the process returns to step S1101 and waits for the selection of the inputted items.

This invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art. The present invention may also be implemented by the preparation of application specific integrated circuits or by interconnecting an appropriate network of conventional component circuits, as will be readily apparent to those skilled in the art.

Obviously, numerous additional modifications and variations of the present invention are possible in light of the above teachings. It is therefore to be understood that within the scope of the appended claims, the present invention may be practiced otherwise than as specifically described herein.

What is claimed as new and is desired to be secured by Letters Patent of the United States is:

1. A server connected to a network having a client computer and a plurality of image forming apparatuses, comprising:
   sending means for sending to said client computer a predetermined set of basic print capabilities pertinent to said plurality of image forming apparatuses;
   receiving means for receiving, from said client computer, a primary print function selection instruction corresponding to at least one basic print capability selected from among said predetermined set of basic print capabilities;
   searching means for performing a search for at least one desired image forming apparatus satisfying said primary print function selection instruction from among said plurality of image forming apparatuses;
   outputting means for outputting, as a result of said search, one of a first list indicating image forming apparatuses satisfying all requirements of said primary print function selection instruction when such image forming apparatuses exist and a second list indicating image forming apparatuses satisfying a part of the requirements of said primary print function selection instruction when such image forming apparatuses exist and no image forming apparatus satisfying all requirements of said primary print function selection instruction exists;
   receiving means for receiving a printer selection instruction sent from said client computer for selecting one desired image forming apparatus from said first or second list;
   transmitting means for transmitting, to said client computer, information items associated with image forming inherent in said one desired image forming apparatus selected;
   admitting means for admitting a secondary print function selection instruction sent from said client computer corresponding to said information items associated with image forming inherent in said one desired image forming apparatus selected; and
   commanding means for commanding said one selected desired image forming apparatus with a print execution instruction including said secondary print function selection instruction.

2. The server of claim 1, further comprising:
   storing means for previously storing said information items associated with image forming inherent in each one of said plurality of image forming apparatuses,
   wherein said information items include the predetermined set of basic print capabilities.

3. The server of claim 1, wherein said first and second lists indicating said image forming apparatuses output by said outputting means further indicate status information and location information corresponding to said image forming apparatuses.

4. The server of claim 1, wherein said second list indicates said image forming apparatuses satisfying a part of said primary print function selection instruction in order of decreasing satisfaction of said primary print function selection instruction.

5. The server of claim 1, further comprising:
   storing means for storing a layout of control elements in an operating panelboard,
   wherein said transmitting means further transmits a layout of control elements in an operating panelboard of said one selected desired image forming apparatus.

6. The server of claim 1, wherein said print execution instruction further includes said primary print function selection instruction.

7. A client computer connected to a network having a server and a plurality of image forming apparatuses, said client computer comprising:
   indicating means for indicating information;
   receiving means for receiving, from said server, information including a predetermined set of basic print capabilities pertinent to said plurality of image forming apparatuses and causing said indicating means to indicate said predetermined set of basic print capabilities pertinent to said plurality of image forming apparatuses;
   receiving means for receiving an entry of a primary print function selection instruction corresponding to at least one basic print capability selected from among said predetermined set of basic print capabilities indicated by said indicating means and for sending said primary print function selection instruction to said server;
   obtaining means for obtaining, as a result of a search performed by said server, a first list indicating image forming apparatuses satisfying all requirements of said primary print function selection instruction when such image forming apparatuses exist and a second list indicating image forming apparatuses satisfying a part of the requirements of said primary print function selection instruction when such image forming apparatuses exist and no image forming apparatus satisfying all requirements of said primary print function selection instruction exists, and for causing said indicating means to indicate said first and second list;

transmitting means for transmitting a printer selection instruction to said server for selecting one desired image forming apparatus from said first or second list;

admitting means for admitting information items sent from said server and associated with image forming inherent in said one desired image forming apparatus selected, and for causing said indicating means to indicate said information items;

entering means for entering and transferring, to said server, a secondary print function selection instruction corresponding to said information items associated with image forming inherent in said one desired image forming apparatus selected; and commanding means for commanding said one selected desired image forming apparatus via said server with a print execution instruction including said secondary print function selection instruction.

8. The client computer of claim 7, wherein said admitting means further admits a layout of control elements in an operating panelboard of said one selected desired image forming apparatus sent from said server when said transmitting means transmits said printer selection instruction for said one desired image forming apparatus, and causes said indicating means to indicate said layout.

9. The server of claim 7, wherein said print execution instruction further includes said primary print function selection instruction.

10. A network system comprising:
a client computer;
a plurality of image forming apparatuses; and
a server comprising:
sending means for sending to said client computer a predetermined set of basic print capabilities pertinent to said plurality of image forming apparatuses;
receiving means for receiving, from said client computer, a primary print function selection instruction corresponding to at least one basic print capability selected from among said predetermined set of basic print capabilities;
searching means for performing a search for at least one desired image forming apparatus satisfying said primary print function selection instruction from among said plurality of image forming apparatuses;
outputting means for outputting, as a result of said search, a first list indicating image forming apparatuses satisfying all requirements of said primary print function selection instruction when such image forming apparatuses exist and image forming apparatuses satisfying a part of said primary print function selection instruction when such image forming apparatuses exist and no image forming apparatus satisfying all requirements of said primary print function selection instruction exists;
receiving means for receiving a printer selection sent from said client computer for selecting instruction one desired image forming apparatus from said first or second list;
transmitting means for transmitting, to said client computer, information items associated with image forming inherent in said one desired image forming apparatus selected;
admitting means for admitting a secondary print function selection instruction sent from said client computer corresponding to said information items associated with image forming inherent in said one desired image forming apparatus selected; and commanding means for commanding said one selected desired image forming apparatus with a print execution instruction including said secondary print function selection instruction;

wherein said client computer comprises:
receiving means for receiving, from said server, said predetermined set of basic print capabilities pertinent to said plurality of image forming apparatuses;
receiving means for receiving an entry of said primary print function selection instruction corresponding to said at least one basic print capability selected from among said predetermined set of basic print capabilities and sending said primary print function selection instruction to said server;
obtaining means for obtaining, as a result of said search performed by said server, said first list indicating said image forming apparatuses satisfying all requirements of said primary print function selection instruction when such image forming apparatuses exist and image forming apparatuses satisfying a part of said primary print function selection instruction when such image forming apparatuses exist and no image forming apparatus satisfying all requirements of said primary print function selection instruction exists;
transmitting means for transmitting said printer selection instruction to said server for selecting said one desired image forming apparatus from said first or second list;
admitting means for admitting said information items sent from said server and associated with image forming inherent in said one desired image forming apparatus selected;
entering means for entering and transferring, to said server, said secondary print function selection instruction corresponding to said information items associated with image forming inherent in said one desired image forming apparatus selected;
commanding means for commanding said one selected desired image forming apparatus via said server with said print execution instruction including said secondary print function selection instruction; and
indicating means for indicating at least said predetermined set of basic print capabilities, said first or second list, and said information items upon arrival from said server.

11. The server of claim 10, wherein said print execution instruction further includes said primary print function selection instruction.

12. A method of controlling a network image forming, comprising:
indicating a predetermined set of basic print capabilities pertinent to a plurality of image forming apparatuses connected to a network;
allowing an entry of a primary print function selection instruction corresponding to at least one basic print capability selected from among said predetermined set of basic print capabilities indicated by said indicating;
performing a search for at least one desired image forming apparatus satisfying said primary print function selection instruction from among said plurality of image forming apparatuses;
indicating, as a result of said search, a first list indicating image forming apparatuses satisfying all requirements of said primary print function selection instruction when such image forming apparatuses exist and image forming apparatuses satisfying a part of said primary print function selection instruction when such image forming apparatuses exist and no image forming apparatus satisfying all requirements of said primary print function selection instruction exists;

receiving a printer selection instruction for selecting one desired image forming apparatus from said first or second list;

indicating information items associated with image forming inherent in said one desired image forming apparatus selected;

admitting a secondary print function selection instruction corresponding to said information items associated with image forming inherent in said one desired image forming apparatus selected; and commanding said one selected desired image forming apparatus with a print execution instruction including said secondary print function selection instruction.

13. The server of claim 12, wherein said print execution instruction further includes said primary print function selection instruction.

14. A server connected to a network having a client computer and a plurality of image forming apparatuses, comprising:

a communication device configured to send to said client computer a predetermined set of basic print capabilities pertinent to said plurality of image forming apparatuses;

a receiver configured to receive, from said client computer, a primary print function selection instruction corresponding to at least one basic print capability selected from among said predetermined set of basic print capabilities;

a searching device configured to perform a search for at least one desired image forming apparatus satisfying said primary print function selection instruction from among said plurality of image forming apparatuses;

an output configured to output, as a result of said search, one of a first list indicating image forming apparatuses satisfying all requirements of said primary print function selection instruction when such image forming apparatuses exist and a second list indicating image forming apparatuses satisfying a part of the requirements of said primary print function selection instruction when such image forming apparatuses exist and no image forming apparatus satisfying all requirements of said primary print function selection instruction exists;

an input configured to receive a printer selection instruction sent from said client computer for selecting one desired image forming apparatus from said first or second list;

a transmitter configured to transmit, to said client computer, information items associated with image forming inherent in said one desired image forming apparatus selected;

an admitting device configured to admit a secondary print function selection instruction sent from said client computer corresponding to said information items associated with image forming inherent in said one desired image forming apparatus selected; and a control device configured to command said one selected desired image forming apparatus with a print execution instruction including said secondary print function selection instruction.

15. The server of claim 14, further comprising:

a memory configured to previously store said information items associated with image forming inherent in each one of said plurality of image forming apparatuses, wherein said information items include the predetermined set of basic print capabilities.

16. The server of claim 14, wherein said first and second lists indicating said image forming apparatuses output by said output further indicate status information and location information corresponding to said image forming apparatuses.

17. The server of claim 14, wherein said second list indicates said image forming apparatuses satisfying a part of said primary print function selection instruction in order of decreasing satisfaction of said primary print function selection instruction.

18. The server of claim 14, further comprising:

a memory configured to store a layout of control elements in an operating panelboard, wherein said transmitter further transmits a layout of control elements in an operating panelboard of said one selected desired image forming apparatus.

19. The server of claim 14, wherein said print execution instruction further includes said primary print function selection instruction.

20. A client computer connected to a network having a server and a plurality of image forming apparatuses, said client computer comprising:

an indicator configured to indicate information;

an input configured to receive, from said server, information including a predetermined set of basic print capabilities pertinent to said plurality of image forming apparatuses and causing said indicator to indicate said predetermined set of basic print capabilities pertinent to said plurality of image forming apparatuses;

an input configured to receive an entry of a primary print function selection instruction corresponding to at least one basic print capability selected from among said predetermined set of basic print capabilities indicated by said indicator and to send said primary print function selection instruction to said server;

a controller configured to obtain, as a result of a search performed by said server, a first list indicating image forming apparatuses satisfying all requirements of said primary print function selection instruction when such image forming apparatuses exist and a second list indicating image forming apparatuses satisfying a part of the requirements of said primary print function selection instruction when such image forming apparatuses exist and no image forming apparatus satisfying all requirements of said primary print function selection instruction exists, and to cause said indicator to indicate said first and second list;

a transmitter configured to transmit a printer selection instruction to said server for selecting one desired image forming apparatus from said first or second list;

an admitting device configured to admit information items sent from said server and associated with image forming inherent in said one desired image forming apparatus selected, and to cause said indicator to indicate said information items;

an input configured to enter and transfer, to said server, a secondary print function selection instruction corresponding to said information items associated with image forming inherent in said one desired image forming apparatus selected; and a controller configured to command said one selected desired image forming apparatus via said server with a print execution instruction including said secondary print function selection instruction.

21. The client computer of claim 20, wherein said admitting device further receives a layout of control elements in an operating panelboard of said one selected desired image forming apparatus sent from said server when said transmitter transmits said printer selection instruction for said one desired image forming apparatus, and causes said indicator to indicate said layout.

22. The server of claim 20, wherein said print execution instruction further includes said primary print function selection instruction.

23. A network system comprising:
   a client computer;
   a plurality of image forming apparatuses; and
   a server comprising:
      an output configured to said client computer a predetermined set of basic print capabilities pertinent to said plurality of image forming apparatuses;
      a receiver configured to receive, from said client computer, a primary print function selection instruction corresponding to at least one basic print capability selected from among said predetermined set of basic print capabilities;
      a searching device configured to perform a search for at least one desired image forming apparatus satisfying said primary print function selection instruction from among said plurality of image forming apparatuses;
      an output configured to output, as a result of said search, a first list indicating image forming apparatuses satisfying all requirements of said primary print function selection instruction when such image forming apparatuses exist and image forming apparatuses satisfying a part of said primary print function selection instruction when such image forming apparatuses exist and no image forming apparatus satisfying all requirements of said primary print function selection instruction exists;
      an input configured to receive a printer selection sent from said client computer for selecting instruction one desired image forming apparatus from said first or second list;
      a transmitter configured to transmit, to said client computer, information items associated with image forming inherent in said one desired image forming apparatus selected;
      an admitting device configured to admit a secondary print function selection instruction sent from said client computer corresponding to said information items associated with image forming inherent in said one desired image forming apparatus selected; and
      a control device configured to command said one selected desired image forming apparatus with a print execution instruction including said secondary print function selection instruction;
   wherein said client computer comprises:
      an input configured to receive, from said server, said predetermined set of basic print capabilities pertinent to said plurality of image forming apparatuses;
      an input configured to receive an entry of said primary print function selection instruction corresponding to said at least one basic print capability selected from among said predetermined set of basic print capabilities and to send said primary print function selection instruction to said server;
      a controller configured to obtain, as a result of said search performed by said server, said first list indicating said image forming apparatuses satisfying all requirements of said primary print function selection instruction when such image forming apparatuses exist and image forming apparatuses satisfying a part of said primary print function selection instruction when such image forming apparatuses exist and no image forming apparatus satisfying all requirements of said primary print function selection instruction exists;
      a transmitter configured to transmit said printer selection instruction to said server for selecting said one desired image forming apparatus from said first or second list;
      an admitting device configured to admit said information items sent from said server and associated with image forming inherent in said one desired image forming apparatus selected;
      an input configured to input and transfer, to said server, said secondary print function selection instruction corresponding to said information items associated with image forming inherent in said one desired image forming apparatus selected;
      a controller configured to command said one selected desired image forming apparatus via said server with said print execution instruction including said secondary print function selection instruction; and
      an indicator configured to indicate at least said predetermined set of basic print capabilities, said first or second list, and said information items upon arrival from said server.

24. The server of claim 23, wherein said print execution instruction further includes said primary print function selection instruction.

* * * * *